No. 896,722. PATENTED AUG. 25, 1908.
H. GOTTSCHALK.
PAN CLEANING AND GREASING MACHINE.
APPLICATION FILED DEC. 27, 1907.
2 SHEETS—SHEET 1.
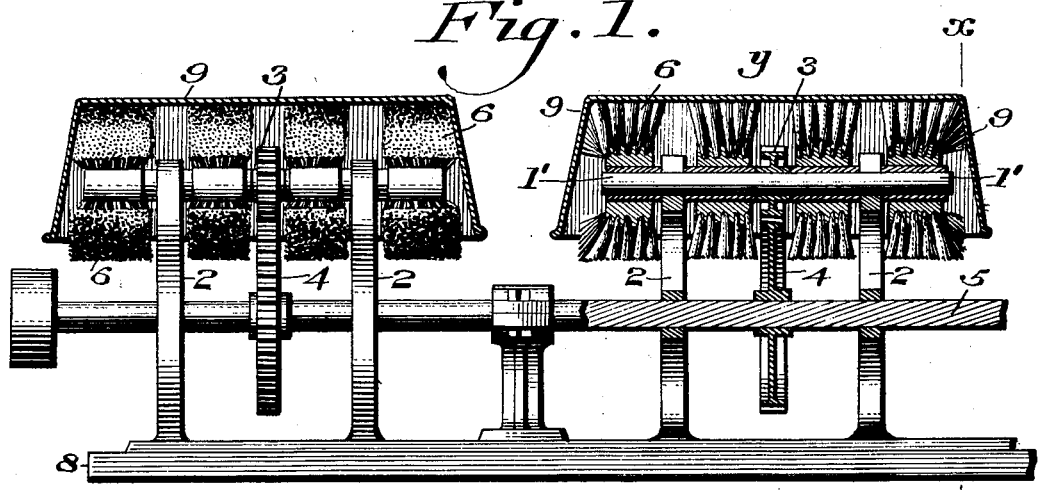
Fig. 1.
Fig. 3.
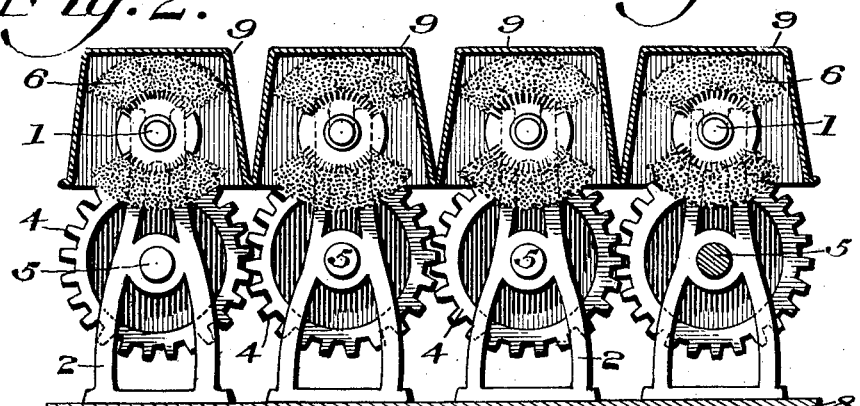
Fig. 2.
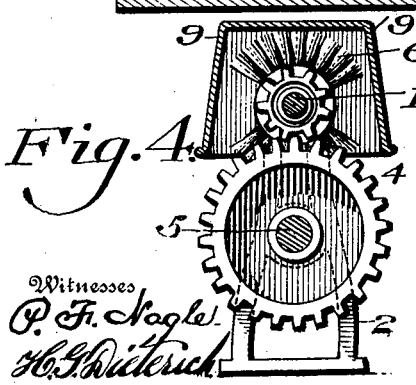
Fig. 4.
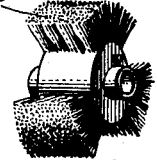
Fig. 5.
Witnesses
P. F. Nagle
H. S. Dieterich
Inventor
Hugo Gottschalk
By Wiedersheim & Fairbanks
Attorneys

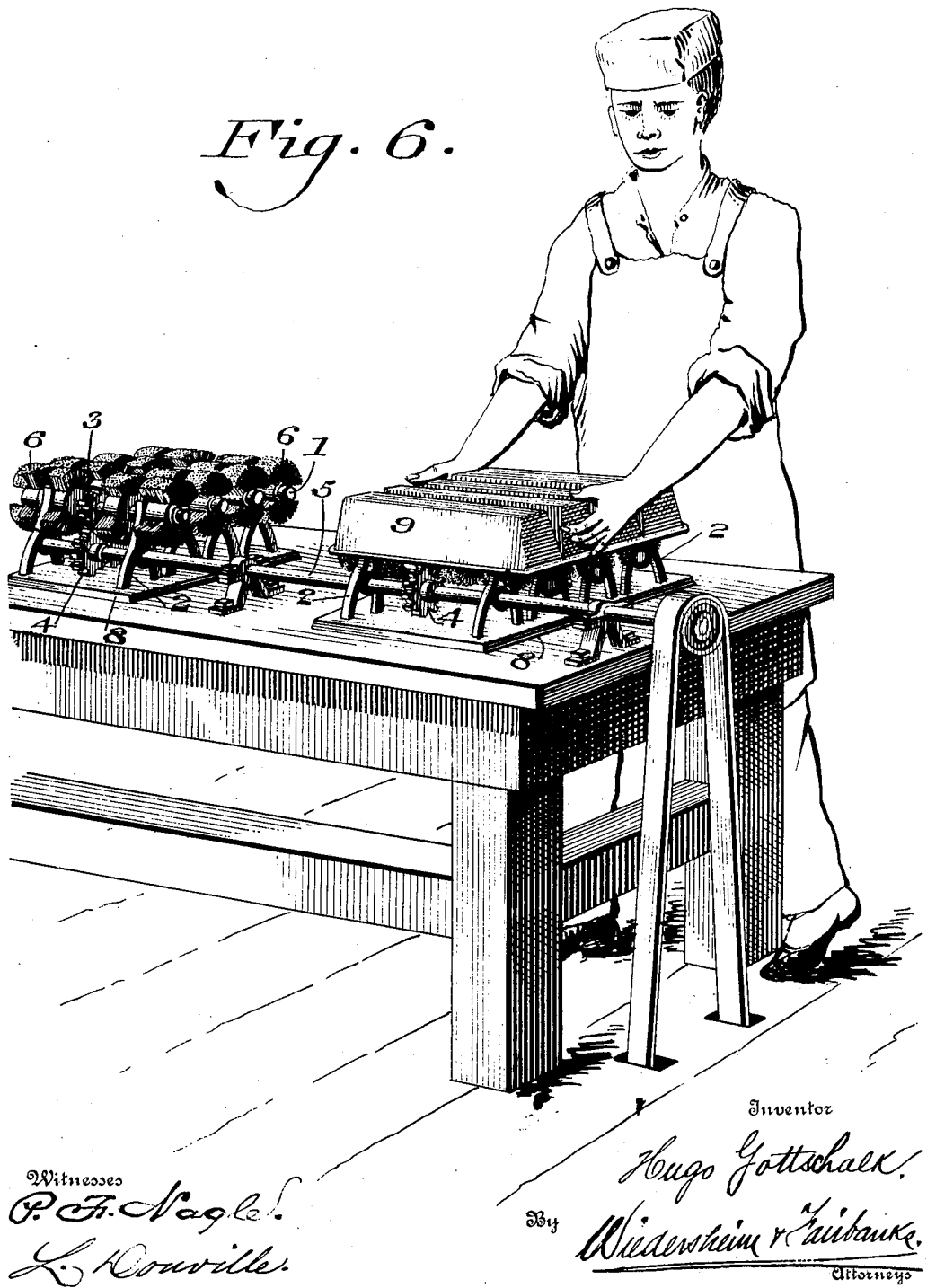

UNITED STATES PATENT OFFICE.

HUGO GOTTSCHALK, OF BURNHAM, PENNSYLVANIA.

PAN CLEANING AND GREASING MACHINE.

No. 896,722.   Specification of Letters Patent.   Patented Aug. 25, 1908.

Application filed December 27, 1907. Serial No. 408,324.

*To all whom it may concern:*

Be it known that I, HUGO GOTTSCHALK, a citizen of the United States, residing at Burnham, in the county of Mifflin, State of Pennsylvania, have invented a new and useful Pan Cleaning and Greasing Machine, of which the following is a specification.

This invention relates to an apparatus for cleaning and greasing pans of the type generally used in the baking of bread or cake and has for an object the removal of bread crust, cake crust, or other undesirable substances from the pans.

It consists of a series of spindles carrying brushes adapted to be rotated and so mounted as to extend well within a pan which is to be cleaned and reach every corner and portion of the interior thereof.

It further consists of a series of spindles carrying brushes which are adapted to be inserted within a pan and spread a coating of grease uniformly throughout the interior surface thereof.

It further consists of other novel details of construction, all as will be hereinafter fully set forth.

For the purpose of explaining my invention, the accompanying drawing illustrates a satisfactory reduction of the same to practice, but the important instrumentalities thereof may be varied so it is to be understood that the invention is not limited to the specific arrangement and organization shown and described.

Figure 1 represents a vertical section of a complete machine embodying my invention. Fig. 2 represents a vertical section in side elevation on line *x—x*, Fig. 1. Fig. 3 represents a perspective view in detail of the brush spindle. Fig. 4 represents a section on line *y—y*, Fig. 1. Fig. 5 represents a perspective view of one of the greasing brushes. Fig. 6 represents a view of the device in use.

Similar numerals of reference indicate corresponding parts in the figures.

Referring to the drawings: 1 and 1' designate brush carrying spindles suitably mounted on bearing posts 2 and adapted to be rotated in any suitable manner. In the present instance a gear 3 is keyed respectively to the spindles 1 and 1' and meshes with a gear 4 secured to the driving shaft 5.

The spindle 1 carries thereon a cleaning brush 6 which is preferably formed in two segments as shown in Fig. 2 in order that any dirt or dust collected in the cleaning of a pan may escape between the segments of the brush. The spindle 1' carries a somewhat similar brush 7 adapted to receive a coating of grease which it applies to the pans and in order to produce a uniform spreading of the same is preferably made in three segments as illustrated in Fig. 5.

Attention is called to the fact that the spindles carrying the sets of brush segments are raised a sufficient distance above the supporting table 8 in order that a bread pan 9 may be lowered over a brush and inclose both the spindle and brush on the inside thereof and by tilting the pan back and forth every corner of the pan may be reached and cleaned. This feature of the raised spindle is a very important one, allowing as it does the brush to entirely enter the pan and clean every portion thereof. As the pans for which this machine is adapted to clean and grease are usually connected in pairs or a series of four pans, the brushes are usually mounted on a series of spindles as shown in Fig. 2 and the gears 4 placed in mesh with one another so as to produce a rotation of each brush throughout the series. It will be noted on very large wide pans two or more brushes may be employed for each pan. The operation of the greasing brushes is exactly the same in that they are mounted similarly and also extend completely within the pan.

The operation of the device is exactly the same whether one or a plurality of pans are used and consists of rotating the brush and lowering a pan first over the cleaning set so that the pan completely incloses the brush and the spindle then it is tilted backward and forward over the brush at the same time pressing it firmly thereagainst. The pan is then removed and in the same manner lowered over and held against the greasing brushes which apply a thin coat of grease to the inside of the pan. By my novel cleaning and greasing device I am able to thoroughly clean the pans and do the same in a minimum amount of time while in the greasing process the pans are evenly coated and a like amount of grease placed upon each pan which has been impossible to perform by the greasing means heretofore in use.

I preferably form the supports or bearing posts 2 with the yokes or journals for the shafts 1, so that the same can be simply dropped thereinto, the brushes 6 or 7 being provided with the extending collars for holding the same supported on the shafts and the end brushes being preferably provided with set screws, as shown in Fig. 5, for holding the parts in position.

Having thus described my invention, what I claim as new and desire to secure by Letters Patent, is:—

1. In a pan cleaning and greasing machine, a plurality of spindles, a plurality of segmental brushes on each spindle, a driving shaft, gearing coöperating therewith to rotate said spindles and supports whereby each set of brushes may be inclosed within a baking pan.

2. In a pan cleaning and greasing machine, a plurality of spindles, a plurality of segmental brushes spaced apart on each spindle, a driving shaft, gearing coöperating therewith to rotate said spindles and supports whereby each set of brushes may be inclosed within a baking pan.

3. In a device of the character described, a spindle, a brush thereon comprising a plurality of sets of segments, a driving shaft adjacent said spindle, a plurality of supports for said spindle, gearing intermediate said supports and said brush segments, and a set of brush segments exterior of each support.

HUGO GOTTSCHALK.

Witnesses:
ROBERT M. BARR,
ANDREW A. HELDRICH.